United States Patent
Lin et al.

(10) Patent No.: US 9,373,997 B1
(45) Date of Patent: Jun. 21, 2016

(54) POWER CONVERTING APPARATUS WITH DYNAMIC DRIVING ADJUSTMENT

(71) Applicant: INNO-TECH CO., LTD., Taipei (TW)

(72) Inventors: Shu-Chia Lin, Taipei (TW);
Ching-Yuan Lin, Taipei (TW); Chih Feng Lin, Taipei (TW); Wen-Yueh Hsieh, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 14 days.

(21) Appl. No.: 14/640,961

(22) Filed: Mar. 6, 2015

(30) Foreign Application Priority Data

Jan. 23, 2015 (TW) .............................. 104102393 A (51) Int. Cl.
*H02M 3/335* (2006.01)
*H02M 1/42* (2007.01)
*H02M 1/44* (2007.01)

(52) U.S. Cl.
CPC *H02M 1/42* (2013.01); *H02M 1/44* (2013.01); *H02M 3/33507* (2013.01)

(58) Field of Classification Search
CPC . H02M 3/315; H02M 3/335; H02M 3/33569; H02M 3/33507; H02M 3/33538; H02M 3/33546; H02M 3/33553; H02M 3/33523; H02M 5/40; H02M 5/42; H02M 5/453; H02M 7/515; H02M 7/53
USPC ............... 363/20, 21.01, 21.04, 21.07, 21.12, 363/21.15, 34, 95, 97
See application file for complete search history.

(56) References Cited

U.S. PATENT DOCUMENTS

| | | | | |
|---|---|---|---|---|
| 9,331,585 | * | 5/2016 | Lin ................... | H02M 3/33507 |
| 2003/0227279 | A1* | 12/2003 | Feldtkeller ............ | H02M 3/156 323/222 |
| 2006/0031736 | A1* | 2/2006 | Fahlenkamp ........ | H02M 1/4225 714/755 |
| 2008/0198638 | A1* | 8/2008 | Reinberger .......... | H02M 3/3376 363/74 |
| 2010/0156319 | A1* | 6/2010 | Melanson ........... | H05B 33/0839 315/297 |
| 2013/0147452 | A1* | 6/2013 | Yang .......................... | G05F 1/44 323/282 |
| 2015/0138856 | A1* | 5/2015 | Huynh ................ | H02M 1/4225 363/84 |
| 2015/0311810 | A1* | 10/2015 | Chen .................. | H02M 3/33515 363/21.13 |
| 2015/0312982 | A1* | 10/2015 | Melanson .......... | H05B 33/0815 315/287 |

* cited by examiner

*Primary Examiner* — Adolf Berhane
(74) *Attorney, Agent, or Firm* — Lin & Associates Intellectual Property, Inc.

(57) ABSTRACT

A power converting apparatus with dynamical driving adjustment includes a rectifying unit, a power factor correction unit, a power conversion unit and a feedback unit. The rectifying unit rectifies an AC input power to generate and transfer a DC power to the power factor correction unit for performing power factor correction. A power factor correction power is generated and transferred to the power conversion unit. The feedback unit is electrically connected to the power conversion unit to form a closed control loop. A PWM driving controller of the power conversion unit performs an adjustment process to control a switching transistor based on a feedback signal from the feedback unit, and the power conversion unit converts the power factor correction power into an output power supplied to an external load. Thus, the margin for electromagnetic interference is increased, and both switching loss and conduction loss are considerably reduced.

19 Claims, 9 Drawing Sheets

POWER CONVERTING APPARATUS WITH DYNAMIC DRIVING ADJUSTMENT

CROSS-REFERENCE TO RELATED APPLICATION

This application claims the priority of Taiwanese patent application No. 104102393, filed on Jan. 23, 2015, which is incorporated herewith by reference.

BACKGROUND OF THE INVENTION

1. Field of the Invention

The present invention generally relates to a power converting apparatus, and more specifically to a power converting apparatus with dynamical driving adjustment for a power conversion unit using forward, full bridge, half bridge, boost or buck structure and for performing an adjustment process to reduce electromagnetic interference, switching loss and conduction loss by generating a PWM driving signal based on the dynamic state of the switch transistor.

2. The Prior Arts

Lately, power conversion efficiency has been a crucial topic for various electronic products, which need different voltage or current of electric power to normally operation. For instance, integrated circuits (ICs) need 5V or 3V, electric motors need 12V DC power, and lamps of LCD monitors need much higher voltage like 1150V. Thus, it is needed for power converters to meet the requirements of actual applications.

In the prior arts, the scheme of switching power conversion is one of the primary technologies of power conversion, and generally employs the pulsed width modulation (PWM) signal at high frequency to drive the switch transistor (or called driving transistor) to turn on so as to control the current of the inductors (or transformer) connected in series to the switch transistor. When the switch transistor is turned off, the current flowing through the inductor does not stop but gradually changes because the inductor has an effect of sustaining the current to avoid abrupt change. Thus, the inductor is charged or discharged, thereby attaining the purpose of changing the output voltage.

Figure 1:
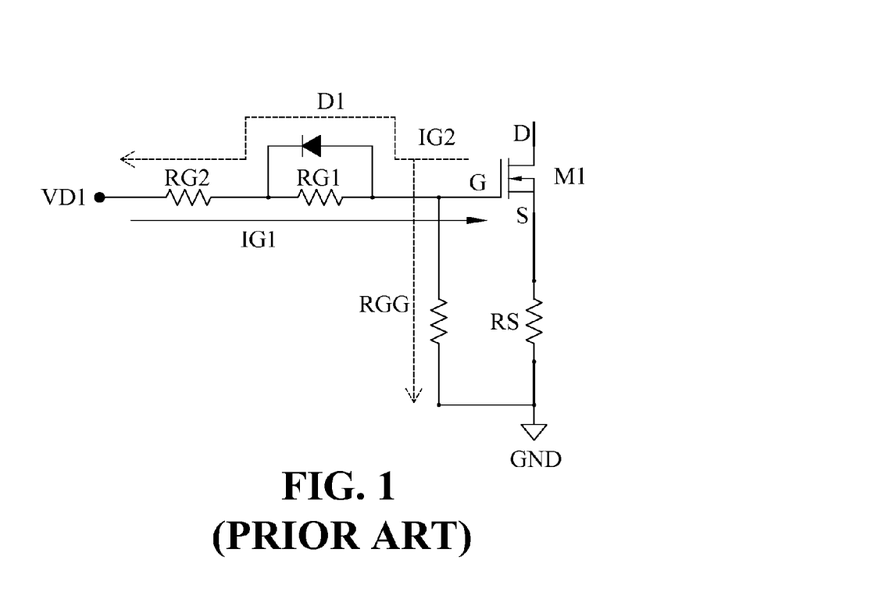
FIG. 1 is an illustrative view showing the adjustment of driving capability for the switch transistor in the prior arts.

Please refer to FIG. 1 showing the adjustment of driving capability for the switch transistor in the prior arts. The driving signal VD1 is generated by the pre-driver to provide fixed driving capability through a source current/sink current architecture. To adjust driving capability of the switch transistor M1, the first gate resistor RG1, the second gate resistor RG2, the switch diode D1 and the pull-low resistor RGG are used. The first gate resistor RG1 and the second gate resistor RG2 are connected in series, wherein first gate resistor RG1 receives the driving signal VD1 and the second gate resistor RG2 drives the gate G of the switch transistor M1. Additionally, the switch diode D1 and the second gate resistor RG2 are parallel connected, and the pull-low resistor RGG is connected across the gate G of the switch transistor M1 and the ground GND. Thus, to turn on the switch transistor M1, the driving signal VD1 controls the driving current IG1 to flow through the first gate resistor RG1 and the second gate resistor RG2 to the gate G of the switch transistor M1. At this time, the switch diode is reverse biased and turned off, and the voltage of the gate G is increased to turn on the switch transistor M1. To turn off. When the switch transistor M1, the driving signal VD1 is reduced such that the voltage of the gate G drops because of the turn-off current IG2. Specifically, the switch diode is turned on due to forward biasing, and the turn-off current IG2 flows through the switch diode D1 and the second gate resistor RG2, instead of flowing through the first gate resistor Rg1. Additionally, the turn-off current IG2 may flow to the ground GND through the pull-low resistor RGG.

For example, in the turn-off operation of the switch transistor M1, when the first gate resistor RG1 is 0Ω (ohm) and the second gate resistor is 22Ω, the falling time for the drain-source voltage (Vds) of the switch transistor M1 is about 80 ns, and the time for Miller plateau of the gate-source voltage (Vgs) of the switch transistor M1 is about 200 ns. Alternatively, if the first gate resistor RG1 and the second gate resistor are 100Ω (ohm) and 22Ω, respectively, the falling time is prolonged to about 104 ns, and the time for Miller plateau is increased up to about 300 ns. Thus, power conversion efficiency can be increased by reducing the first gate resistor RG1 and the second gate resistor RG2, but EMI issue is still not improved. While EMI can be reduced by increasing the first gate resistor RG1 and the second gate resistor RG2 to prolong the falling time, Miller plateau extends too much and the effective turn-on resistance of the switch transistor M1 can not fast decrease. As a result, power conversion efficiency is adversely affected.

It is obvious that the adjustment function for driving capability in the above traditional scheme is implemented by changing the first gate resistor RG1 and the second gate resistor RG2 to control the turn-off speed for the switch transistor M1. However, one drawback in the prior arts is that the first gate resistor RG1 and the second gate resistor RG2 can not be dynamically changed during switching operation to control the driving signal VD1 to adjust the turn-on time and the turn-off time for the switch transistor M1. While it is possible to reduce switching loss, EMI issue is not solved. In other words, during the turn-on process of the switch transistor M1, when the original state of the switch transistor M1 is turn-off and the turn-on current is zero or approximately zero, fast rising the driving signal VD1 dose not improve switching loss issue, but causes EMI to get worse. Alternatively, when the switch transistor is partly or fully turned on, the turn-on current is considerable, and at this time, slowing down the rising speed and the falling speed of the driving signal VD1 may result in larger power consumption at switching transition.

Therefore, it is greatly needed for the power control apparatus with dynamical adjustment of driving capability, which employs the feedback signal to perform the adjustment process to dynamically adjust the PWM driving signal based on the operation state of the switch transistor and consideration of EMI and switching loss, thereby overcoming the above problems in the prior arts.

SUMMARY OF THE INVENTION

The primary objective of the present invention is to provide a power converting apparatus with dynamical driving adjustment comprising a rectifying unit, a power factor correction unit, a power conversion unit and a feedback unit. The rectifying unit receives and rectifies an AC input power to generate and transfer a DC power to the power factor correction unit for performing a process of power factor correction, and then a power factor correction power is generated and transferred to the power conversion unit. Further, the feedback unit is electrically connected to the power conversion unit to form a closed control loop such that a PWM driving controller of the power conversion unit performs an adjustment process based on the feedback signal from the feedback unit to control a switching transistor, and the power conversion unit converts the power factor correction power into an output power supplied to an external load.

Specifically, the power conversion unit comprises a transformer, a pulsed width modulation (PWM) driving controller, a switch transistor, an auxiliary diode, an output inductor, an output diode and an output capacitor. The transformer comprises a first side coil and a second side coil, and the switch transistor is connected to the first side coil. The PWM driving controller controls the switch transistor. The second side coil is connected to the output diode and the output capacitor coupled in series. The output capacitor is connected to the external load in parallel so as to generate the output power, which is supplied to the external load.

The feedback unit comprises a first resistor, a second resistor, a third resistor, a thyristor and a photo coupler. The first, second and third resistors are sequentially connected in series. A connection point of the first and second resistors is connected to a connection point of the output diode and the output capacitor for receiving the output power. A connection point of the second and third resistors is connected to a gate end (G end) of the thyristor, and a positive end (A end) of the thyristor is connected to the output capacitor. The photo coupler is connected between a negative end (K end) of the thyristor and the first resistor such that the photo coupler generates and transfers the feedback signal to the power converting unit.

More specifically, the PWM driving controller performs an adjustment process based on the feedback signal to generate a PWM driving signal for controlling the switch transistor to turn on and turn off.

The switch transistor of the power conversion unit is an N type switch element like NMOS (N-channel Metal-Oxide Semiconductor) or NPN Bipolar Transistor). The PWM driving controller is implemented by an electrical circuit formed of discrete electronic elements, or by a central processing unit (CPU) or a microcontroller (MCU) executing a software program or firmware program. In other words, the PWM driving controller can operate by means of analog or full digital. In particular, the adjustment process performed by the PWM driving controller comprises the following steps.

At the beginning, since the initial current is considerably small in a CCM (continuous conduction mode), or zero in a DCM (discontinuous conduction mode), EMI is the first priority such that the first rising period when the driving voltage generated by the PWM driving controller from 0V up to about 5V needs to be appropriately prolonged.

Next, to reduce conduction loss when the transient phase of the voltage and current of the switch transistor finishes, the driving voltage is fast increased up to more than 8V such that the switch transistor is surely in the saturation state and the conduction current is kept as small as possible. That is, the second rising time when the driving voltage increases from 5V to more than 8V is shortened.

To turn off the switch transistor, the driving voltage should fall down, and since conduction loss is increased if the falling time for the driving voltage is too long, it needs to shorten the falling time. That is, the first falling time when the driving voltage falls from more than 8V down to about 5V is shortened.

Finally, the second falling time when the driving voltage falls from more than 5V down to zero is also suitably shortened.

Another objective of the present invention is to provide a power converting apparatus with dynamical driving adjustment comprising a rectifying unit, a power factor correction unit, a power conversion unit and a feedback unit. In particular, the power conversion unit comprises a full bridge structure, a half bridge structure, a boost structure or a buck structure, and a PWM driving controller of the power conversion unit performs the above-mentioned adjustment process to control the switch transistor so as to achieve the object of dynamically controlling the driving capability.

Thus, the PWM driving controller generates a PWM driving signal based on the feedback signal from the feedback unit to drive and control the switch transistor to turn on and off. As a result, dynamically controlling the driving capability of the switch transistor is implemented. Overall speaking, the EMI effect is improved by prolonging the first rising period, and the switching loss is reduced by shortening the second rising period, the first falling period and the second falling period. The present invention greatly improves the whole power conversion efficiency and is applicable to the practical field of power conversion which is quite related to both EMI issue and power conversion efficiency.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 2:
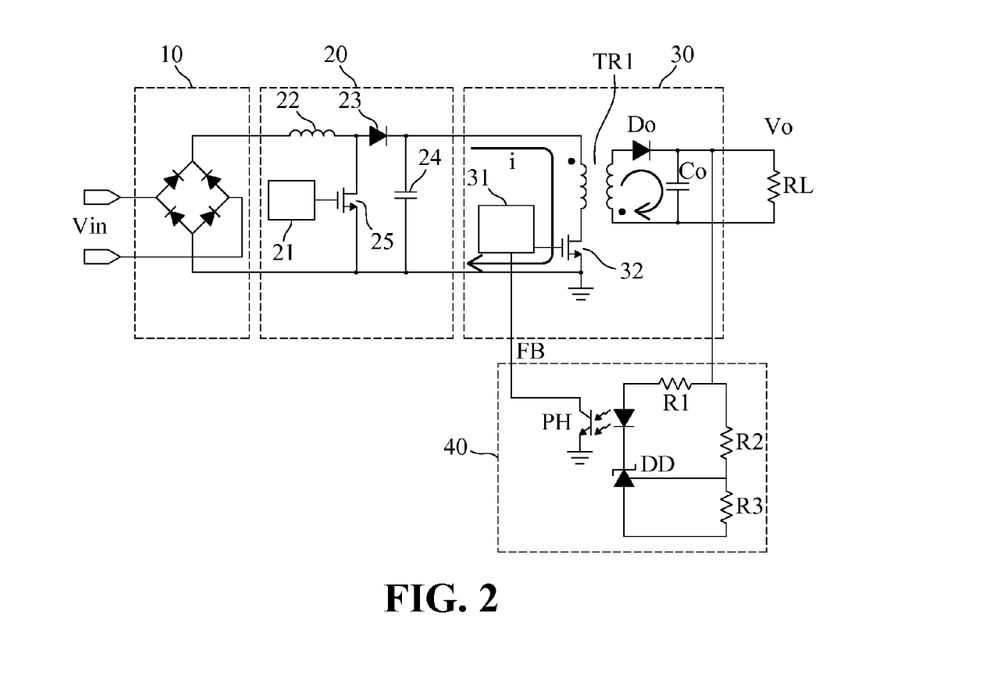
FIG. 2 is a view of the power converting apparatus with dynamical driving adjustment according to the first embodiment of the present invention.

Please refer to FIG. 2 showing the power converting apparatus with dynamical driving adjustment according to the first embodiment of the present invention. As shown in FIG. 2, the power converting apparatus of the first embodiment comprises a rectifying unit 10, a power factor correction (PFC) unit 20, a power conversion unit 30 and a feedback unit 40 for converting an AC (alternative current) input power with an input voltage Vin into an output power with an DC (direct current) output voltage Vo, which is supplied to an external load RL.

More specifically, the rectifying unit 10 is configured to receive and rectify the AC input power so as to generate and transfer a DC power to the power factor correction unit 20, which performs a process of power factor correction to generate and transfer a power factor correction power based on the received DC power. Then, the power conversion unit 30 receives the power factor correction power and performs a process of power conversion for converting the output power supplied the external load RL. The feedback unit 40 is electrically connected to the power conversion unit 30 for receiving and converting the output voltage Vo of the output power into a feedback signal FB, which is transferred back to the power conversion unit 30, such that power conversion unit 30 obtains the state of the external load RL and dynamically adjusts the driving capability. As a result, the overall efficiency of power conversion is greatly improved.

The above-mentioned rectifying unit 10, power factor correction unit 20 and feedback unit 40 can be easily implemented by traditional skills, and are not the key feature of the present invention. Therefore, only brief description about their electrical operation is explained for reference.

As shown in FIG. 2, the rectifying unit 10 is composed of four diodes as a bridge structure, and the power factor correction unit 20 generally comprises a PFC controller 21, which works with an inductor 22, a diode 23, a capacitor 24 and a transistor 25 to exhibit the PFC function.

The power conversion unit 30 comprises a transformer TR1, a pulsed width modulation (PWM) driving controller 31, a switch transistor 32, an output diode Do and an output capacitor Co. The transformer TR1 consists of the first side coil and the second side coil. The output diode Do is connected to the output capacitor Co in series. The switch transistor 32 is connected to one end of the first side coil. The PWM driving controller 31 performs the adjustment process to generate a PWM dicing signal for controlling the operation of turning on and off the switch transistor 32. In addition, the second side coil is connected to the output diode Do and the output capacitor Co in series. The output capacitor Co is connected to the external load RL in parallel and generates the output power.

The PWM driving controller 31 is preferably implemented by a single semiconductor chip like microcontroller (MCU) or central processing unit (CPU), or alternatively, an electrical circuit formed of discrete electrical elements. Thus, the PWM driving controller 31 can operate by means of digital.

The switch transistor 32 is an N type switch element like NMOS (N-channel Metal-Oxide Semiconductor) or NPN bipolar transistor.

Furthermore, the feedback unit 40 may comprise the first resistor R1, the second resistor R2, the third resistor R3, a thyristor DD and a photo coupler PH. The first resistor R1, the second resistor R2 and the third resistor R3 are connected sequentially in series. The connection point of the first resistor R1 and the second resistor R2 is connected to the connection point of the output diode Do and the output capacitor Co for receiving the input power. The connection point of the second resistor R2 and the third resistor R3 is connected to a gate end (G end) of the thyristor DD, a positive end (A end) of the thyristor DD is connected to the output capacitor Co, and the photo coupler PH is connected between a negative end (K end) of the thyristor DD and the first resistor R1. Thus, the photo coupler PH generates the feedback signal FB, which is transferred back to the PWM driving controller 31. In particular, the PWM driving controller 31 obtains the loading state of the external load RL from the feedback signal FB, like light loading or heaving loading. The adjustment process is performed to generate the PWM driving signal VD with an appropriate waveform for controlling the switch transistor 32 to turn on or off, thereby reducing EMI and switching loss.

Figure 4:
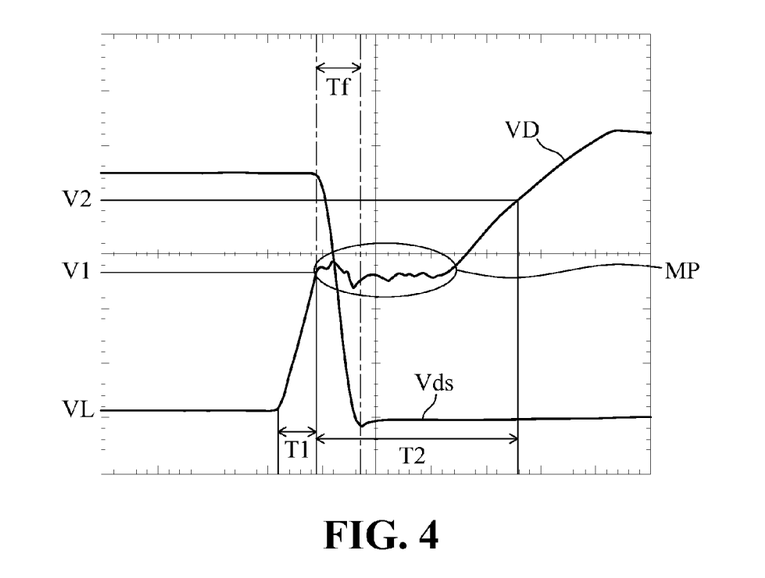
FIG. 4 is a waveform diagram showing the turn-on process of the driving voltage according to the first embodiment.
Figure 5:
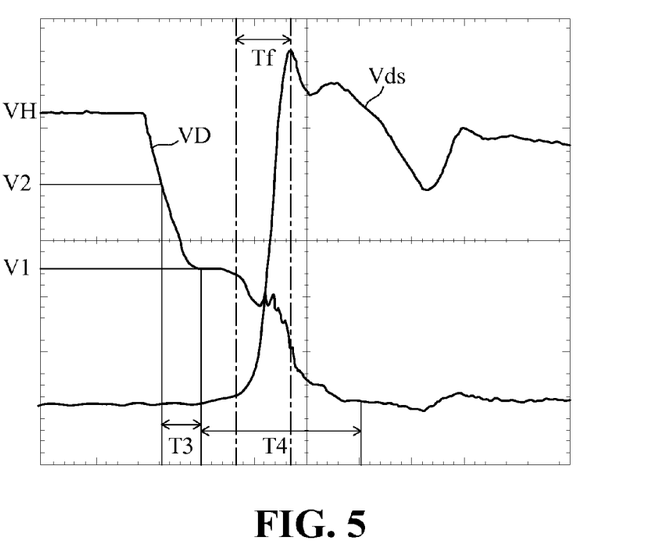
FIG. 5 is a waveform diagram showing the turn-off process of the driving voltage according to the first embodiment.

To explain the feature of reducing EMI and switching loss, please refer to FIGS. 4 and 5 showing the waveforms for turning on and off, respectively. More specifically, the adjustment process of the PWM driving controller 32 comprises the following steps.

At the beginning, the driving voltage of the PWM driving signal VD generated by the PWM driving controller 31 is configured to increase from the lowest voltage VL of 0V up to the first voltage V1 during the first rising period T1.

Next, the driving voltage of the PWM driving signal VD is configured to increase up to the second voltage V2 larger than the first voltage V1 and further attain to the highest voltage VH exceeding the second voltage V2 during the second rising period T2. Thus, the drain-source voltage (Vds) of the switch transistor 32 to turn on the switch transistor 32 is lowered.

The present state is sustained for a preset period of time.

Then, the driving voltage of the PWM driving signal VD falls from the highest voltage VH exceeding the second voltage V2 down to the first voltage V1 during the first falling period T3. Finally, the driving voltage of the PWM driving signal VD falls from the first voltage V1 down to the lowest voltage VL of 0V.

It is preferred that the first voltage V1 is 3V to 6V, and the second voltage V2 is 7V to 9V. Additionally, the drain-source voltage falling time and the drain-source voltage rising time of the switch transistor 32 at an output electrical power of 36 W are less than 200 ns and 100 ns, respectively. Specifically, the drain-source voltage falling time means a time when the drain-source voltage of the switch transistor 32 lowers from a highest drain-source voltage to a lowest drain-source voltage during a turn-on process, and the drain-source voltage rising time means a time when the drain-source voltage of the switch transistor 32 increases from the lowest drain-source voltage to the highest drain-source voltage during a turn-off process. The first rising period T1, the second rising period T2, the first falling period T3 and the fourth falling period T4 are dynamically adjusted and controlled by appropriately enhancing or reducing the driving capability of the PWM driving controller 31.

In addition, the above lowest voltage VL and the highest voltage VH are also dynamically adjustable to match various MOS or transistors so as to reduce conduction loss and/or switching loss, thereby increasing power conversion efficiency.

To further clearly explain the actual performance of the present invention, an example for NMOS as the switch transistor 32 will be described in detail.

Specifically, the first voltage V1 is configured to just turn on the switch transistor 32 such that the drain-source voltage Vds of the switch transistor 32 falls down. The first voltage V1 is about Miller plateau of the switch transistor 32, and Miller plateau is referred to the specific gate-source voltage Vgs of the switch transistor 32, which is maintained as a constant during the switching transition from the turn-off state to the turn-on state or from the turn-on state to the turn-off state. When the drain current Id of the switch transistor 32 is zero, the first rising period T1 is prolonged to reduce EMI issue because switching loss is not affected by the drain current Id of zero. In other words, the rising rate of the driving voltage of the PWM driving signal VD from 0V to the first voltage V1 is kept as slow as possible within the allowable range of EMI. It is intended to adjust the second rising period T2, the first falling period T3 and the fourth falling period T4 as short as possible so as to reduce switching loss and conduction to a minimum value. The reason is that the drain current ID is not zero, and too slow rate for transition results in too much power consumption, leading to poor efficiency of power conversion. Thus, the first rising period T1, the second rising period T2, the first falling period T3 and the fourth falling period T4 are dynamically adjusted by enhancing or reducing the driving capability of the PWM diving controller 32.

The effect of the above adjustment process will be described in detail.

First, the switching loss is not needed to consider but the EMI effect is taken in consideration when the initial turn-on current Ion is smaller at continuous conduction mode (CCM) like the very beginning of power conversion, or the initial turn-on current Ion is just zero at discontinuous conduction mode (DCM). That is, EMI is reduced as much as possible. This is achieved by properly prolonging the first rising period T1.

For the second rising period T2 when the PWM driving signal VD is increased from the first voltage V1 like 5V to the second voltage V2 like 8V, the voltage and current of the switch transistor 32 are switched and completed, and the turn-on current Ion thus increases. To reduce the turn-on loss, it is needed to rise the PWM driving signal VD to exceed the second voltage V2 like 8V so as to assure that the switch transistor 32 fast enter into the saturation state to minimize the turn-on resistance and the switching loss.

The first falling period T3 for the PWM driving signal VD is substantially the time for the transition reversed to the second rising period T2. At this time, the voltage and current of the switch transistor 32 are not yet completed, so if the PWM driving signal VD is lowered too slow, the turn-on consumption is increased. Therefore, the first falling period T3 is needed to shorten in order to fast reduce the turn-on current Ion.

Similarly, the second falling period T4 is substantially the time for the transition reversed to the first rising period T1. At this time, the turn-on current Ion is larger and the efficiency has to be first considered. That is, the second falling period T4 is needed to properly shorten to fast turn on the switch transistor 32, thereby lowering the turn-on current Ion to zero or about zero.

Thus, the present invention performs the adjustment process based on the feedback signal to optimally adjust the PWM driving signal so as to change the driving capability of the switch transistor (the driving transistor or the driver). At the same time, both EMI effect and the turn-on loss are optimized to not only improve electrical performance but also greatly increase the overall efficiency of electrical conversion.

Figure 6:
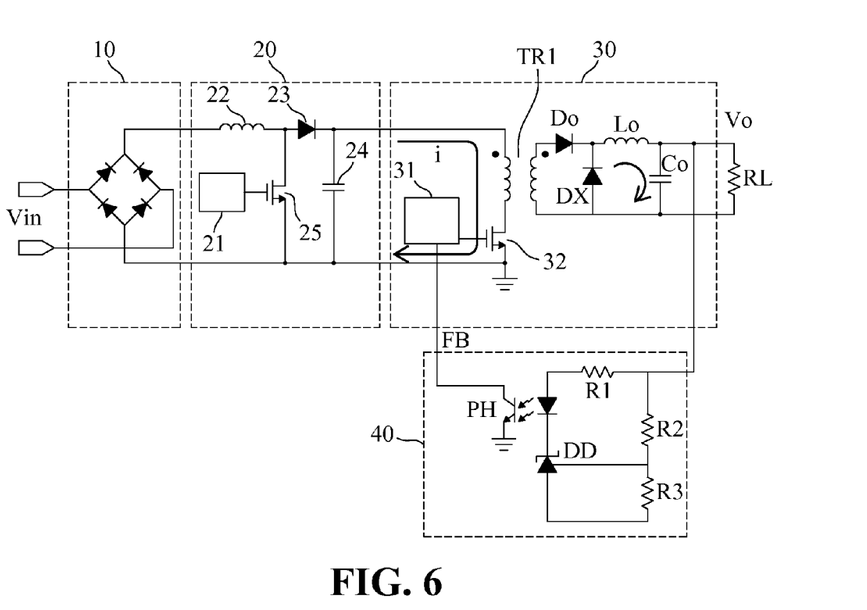
FIG. 6 is a view of the power converting apparatus with dynamical driving adjustment according to the second embodiment of the present invention.

In addition, refer to FIG. 6 illustrating the power converting apparatus with dynamical driving adjustment according to the second embodiment of the present invention. It should be noted that the second embodiment in FIG. 6 is similar to the first embodiment in FIG. 2. The primary difference is that the second side coil of the transformer TR1 in the power converting apparatus of the second embodiment has opposite polarity in comparison with the first embodiment, and the power conversion unit 30 of the second embodiment comprises an auxiliary diode DX and an output inductor Lo in addition to the transformer TR1, the PWM driving controller 31, the switch transistor 32, the output diode Do and the output capacitor Co. Thus, only the feature of the auxiliary diode DX and the output inductor Lo will be described in the following context.

As shown in FIG. 6, a positive end of the output diode Do is connected to an end of the second side coil, a positive end of the auxiliary diode DX is connected to another end of the second side coil, and a negative end of the output diode Do and a negative end of the auxiliary diode DX are connected to an end of the output inductor Lo. Another end of the output inductor Lo is connected to an end of the output capacitor Co, and another end of the output capacitor Co is connected to the other end of the second side coil. Accordingly, the output capacitor Co is connected to the external RL in parallel, and generates the output power.

Furthermore, the specific design of the structure shown in FIG. 6 is a forward structure, and the design shown in FIG. 2 is a flyback structure. These two structures are commonly used in the current power conversion design.

Figure 7:
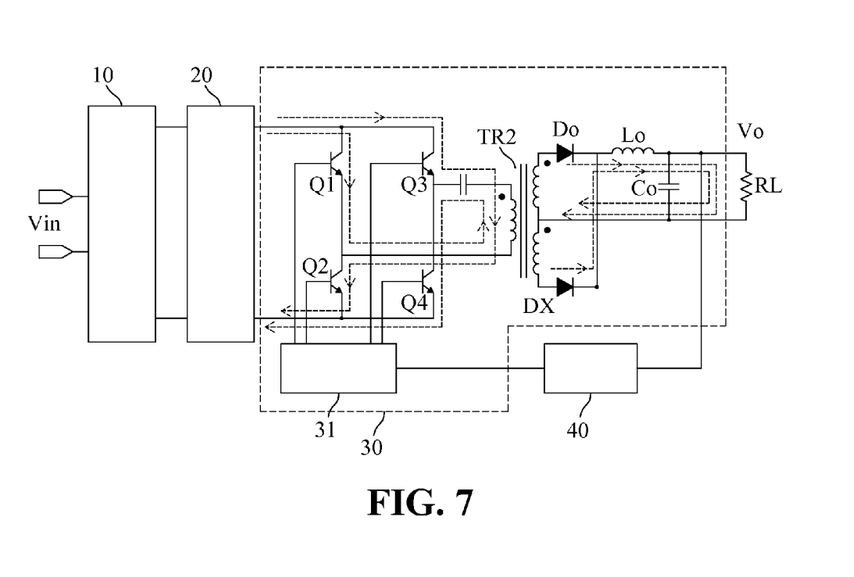
FIG. 7 is a view of the power converting apparatus with dynamical driving adjustment according to the third embodiment of the present invention.
Figure 8:
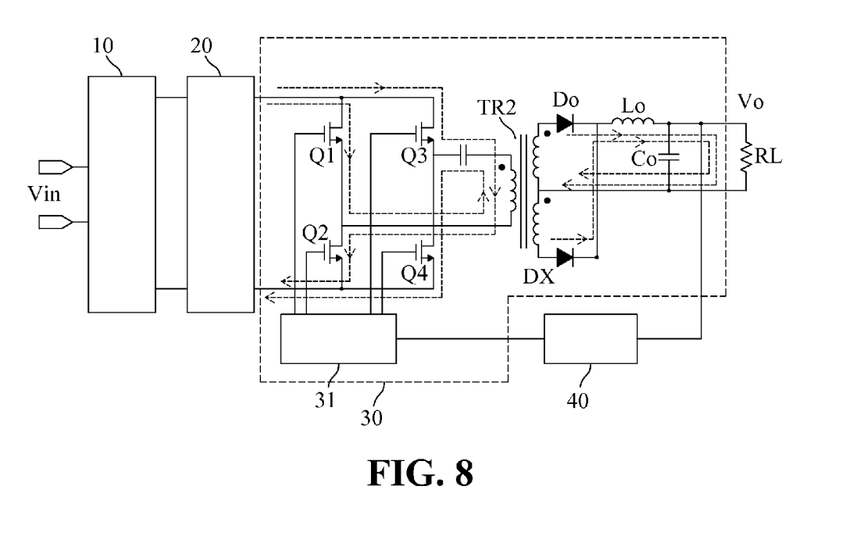
FIG. 8 is a view of the power converting apparatus with dynamical driving adjustment according to the fourth embodiment of the present invention.
Figure 9:
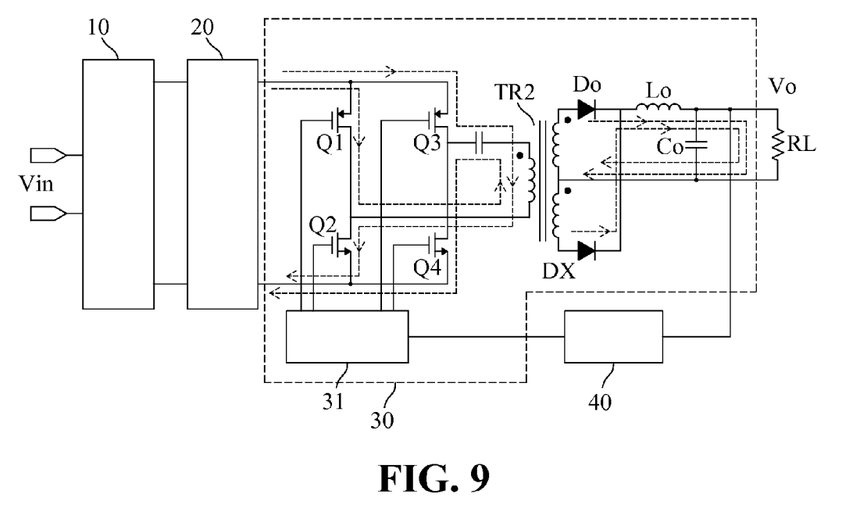
FIG. 9 is a view of the power converting apparatus with dynamical driving adjustment according to the fifth embodiment of the present invention.
Figure 11:
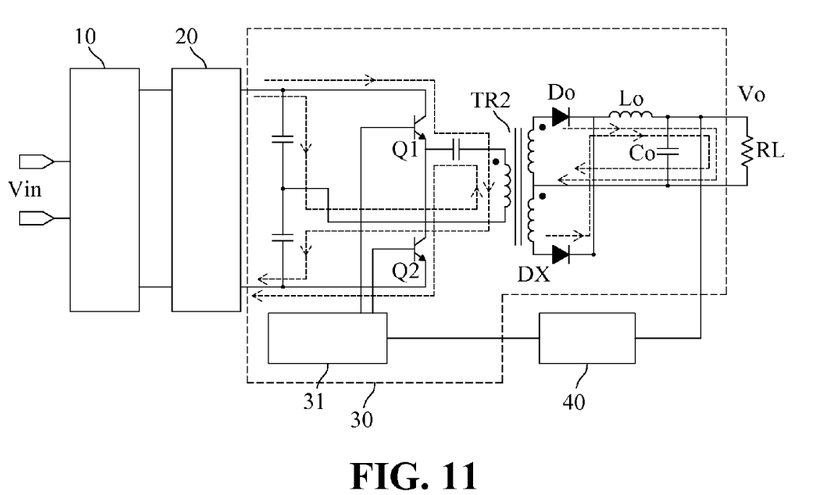
FIG. 11 is a view of the power converting apparatus with dynamical driving adjustment according to the sixth embodiment of the present invention.
Figure 12:
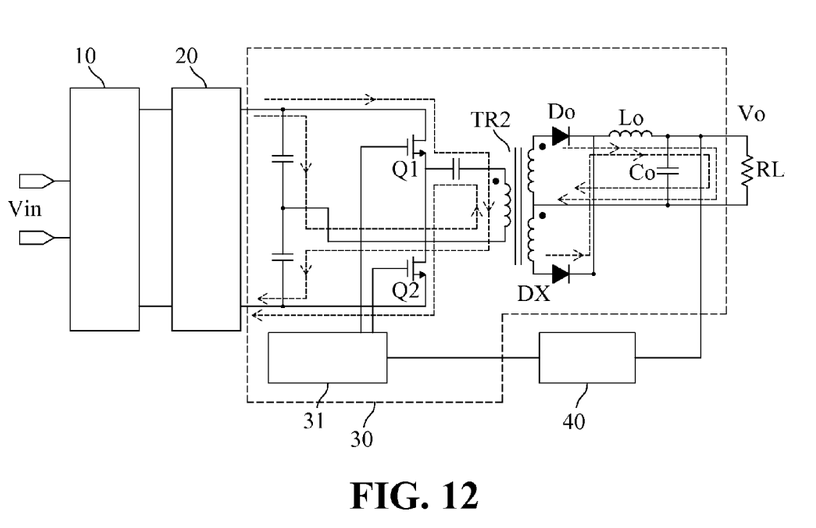
FIG. 12 is a view of the power converting apparatus with dynamical driving adjustment according to the seventh embodiment of the present invention.
Figure 13:
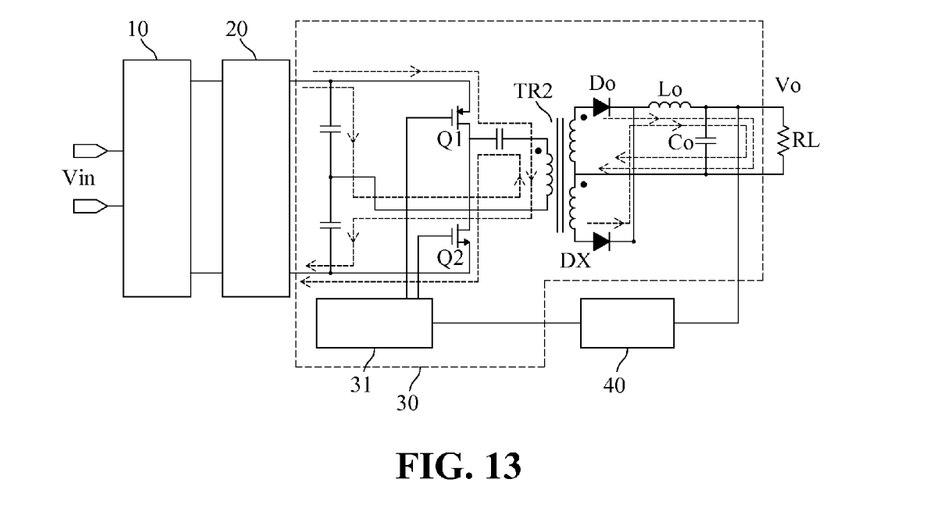
FIG. 13 is a view of the power converting apparatus with dynamical driving adjustment according to the eighth embodiment of the present invention.

The adjustment process of the present invention is applicable to other power conversion structures like full bridge or half bridge, even boost structure or buck structure for controlling the recharging operation of rechargeable batteries. The following context will describe these structures to further explain the aspects of the present invention. FIGS. 7, 8 and 9 show the third, fourth and fifth embodiments of the present, respective, for the power conversion unit 30 implemented by the full bridge structure, and FIGS. 11, 12 and 13 show the sixth, seventh and eighth embodiments of the present, respective, for the power conversion unit 30 implemented by the half bridge structure.

As shown in FIG. 7, except the structure of the PWM driving controller 31, other components of the power conversion unit 30 are similar to the second embodiment, and thus the description about the similar components are omitted. The PWM driving controller 31 is a full bridge structure and comprises a transformer TR2, four switch transistors Q1, Q2, Q3 and Q4, an auxiliary diode DX, an output inductor Lo, an output diode o and an output capacitor Co. The transformer TR2 comprises the first side coil and the second side coil with a center tap end. One end of the second side coil is connected to a positive end of the output diode Do, another end of the second side coil is connected to a positive end of the auxiliary coil, a negative end of the output diode Do is connected to a negative end of the auxiliary coil and one end of the output inductor Lo, another end of the output inductor Lo is connected to one end of the output capacitor Co, and another end of the output capacitor Co is connected to the center tap end of the second coil. Further, the output capacitor Co is connected to the external RL in parallel and generates the output power.

Figure 3:
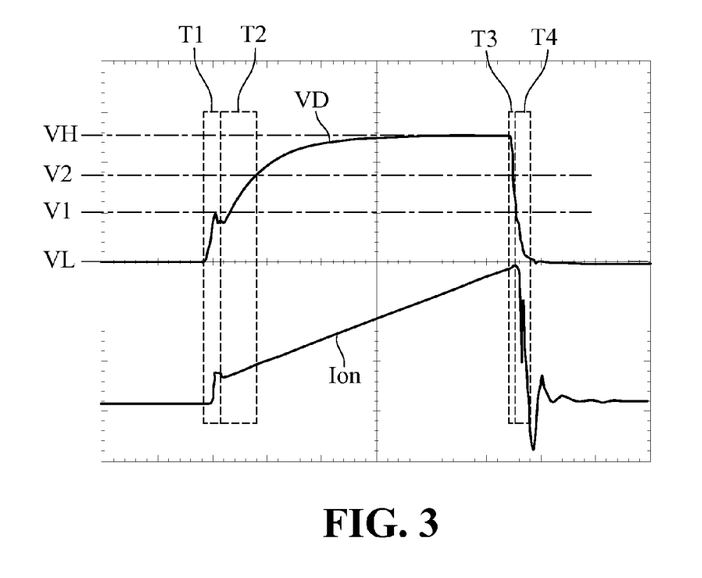
FIG. 3 is a waveform diagram showing the first increasing period, the second increasing period, the first decreasing period and the second decreasing period according to the first embodiment.

Moreover, the PWM driving controller 31 performs the adjustment process based on the feedback signal FB from the feedback unit 40 so as to generate four PWM driving signals for controlling the turn on and off operation of the switch transistors Q1, Q2, Q3 and Q4, respectively. Particularly, the corresponding PWM driving signal for each of the switch transistors Q1, Q2, Q3 and Q4 has a specific waveform. This skill has been well known in the prior arts, and the description for the operation is thus omitted. However, FIGS. 3 to 5 show the features of the PWM driving signals for clearly specifying the adjustment process of the PWM driving controller 31.

The switch transistors Q1, Q2, Q3 and Q4 shown in FIG. 7 are implemented by NPN bipolar transistors, and each of the switch transistors Q1, Q2, Q3 and Q4 shown in FIG. 8 is NMOS. Further, the fifth embodiment of the present invention in FIG. 9 uses two PMOS transistors and two NMOS transistors, which operate as the above transistors, and the related electrical operation is thus omitted.

Figure 10:
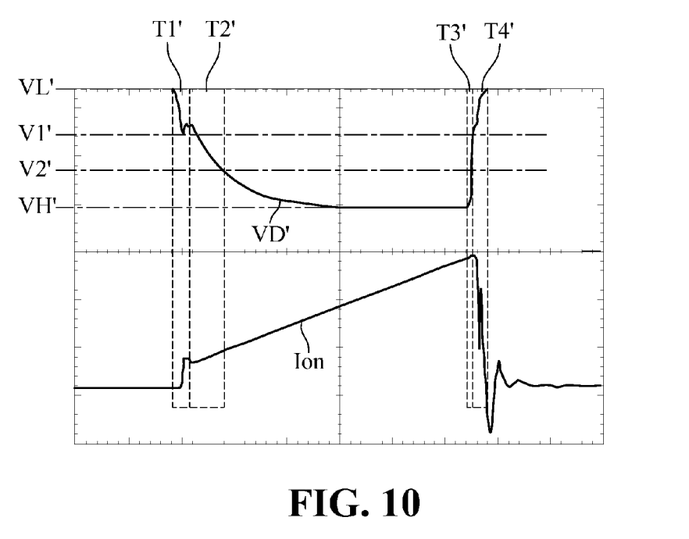
FIG. 10 is a waveform diagram showing the first increasing period, the second increasing period, the first decreasing period and the second decreasing period for the PMOS according to the fifth embodiment.

FIG. 10 typically shows the operation waveform for the PWM driving signal VD' of the PMOS switch transistor Q1 or Q3 of the fifth embodiment in FIG. 9. The waveform also indicates the first rising period T1', the second rising period T2', the first falling period T3' and the second falling period T4' for the PMOS Q1 or Q3. It should be noted that the waveform of the switch transistor of PMOS is basically opposite in phase to the waveform of NOMS, and the operation of rising and falling is reversed so as to properly turn on and off the four switch transistors.

As shown in FIG. 11, the PWM driving controller 31 of the sixth embodiment is a half bridge structure and substantially comprises a transformer TR2, a PWM driving controller 31, two switch transistors Q1 and Q2, an auxiliary diode DX, an output inductor Lo, an output diode Do and an output capacitor Co. Specifically, both the switch transistors Q1 and Q2 are NPN bipolar transistors. The auxiliary diode DX, the output inductor Lo, the output diode Do and the output capacitor Co of the sixth embodiment are connected similar to the third embodiment shown in FIG. 7, and the related description of electrical operation is omitted. In addition, the first side coil of the transformer TR2 is connected to the two switch transistor Q1 and Q2 as the prior arts. It should also be noted that the adjustment process performed by the PWM driving controller 31 is accordingly similar to the above embodiment.

Further refer to FIGS. 12 and 13 for the seventh and eighth embodiments, respectively. Except different types of switch transistors Q1 and Q2 are used, the other components are the same as the above embodiment. The switch transistors Q1 and Q2 in FIG. 12 are NMOS. In FIG. 13, one switch transistor is NMOS, and the other switch transistor is PMOS. The seventh and eighth embodiments exhibit the electrical operation similar to the sixth embodiment.

Figure 14:
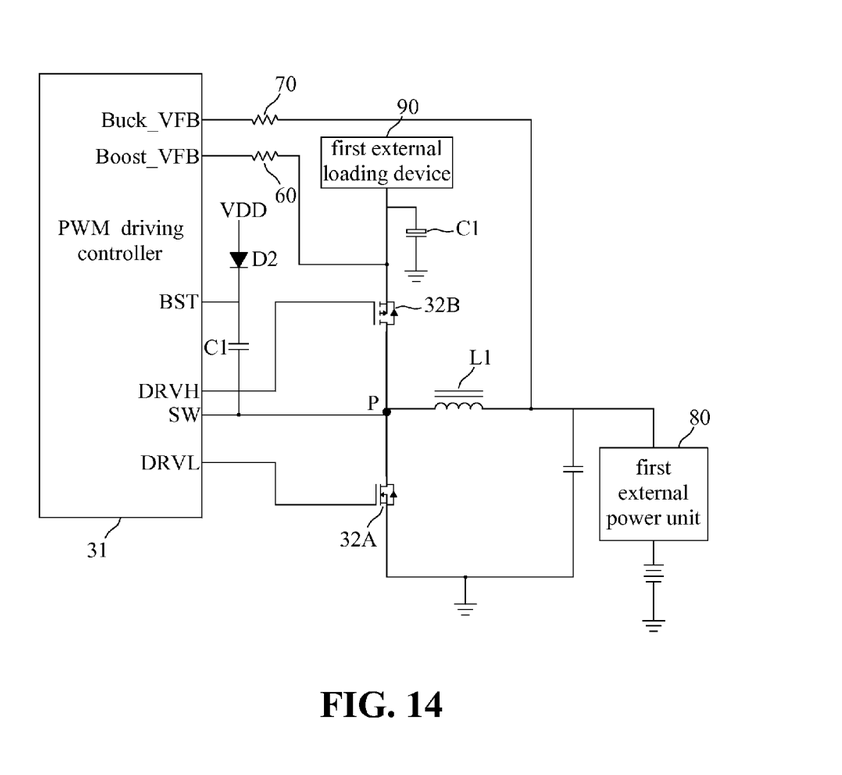
FIG. 14 is a view of the power converting apparatus with dynamical driving adjustment according to the ninth embodiment of the present invention.

In addition, FIG. 14 illustrates the power converting apparatus according to the ninth embodiment of the present invention providing boost conversion and dynamical driving adjustment. Specifically, the power converting apparatus according to the ninth embodiment comprises the PWM driving controller 31, the first switch transistor 32A, the second switch transistor 32B, the boost resistor 60, the buck resistor 70, the inductor L1 and the capacitor C1. The PWM driving controller 31 performs the adjustment process to convert the input power with a lower voltage from the first external power unit 80 into the output power with a higher voltage so as to supply the first external loading device 90. Thus, the boost function is achieved. Since the operation of power conversion for the boost structure is well known in the prior arts, the following description is only focused on the electrical operation of the PWM driving controller 31 for controlling the first switch transistor 32A and the second switch transistor 32B to implement dynamic adjustment and reduce both switching loss and conduction loss.

As shown in FIG. 14, the first external loading device 90 is connected the grounded level through the first switch transistor 32A and the second switch transistor 32B in series. The first switch transistor 32A is NMOS or PMOS, and the second switch transistor 32B is NMOS, PMOS or diode. The gates of the first switch transistor 32A and the second switch transistor 32B are controlled by the PWM driving controller 31. The first external power unit 80 is connected to the connection point P of the first switch transistor 32A and the second switch transistor 32B through the inductor L1, and the PWM driving controller 31 senses the voltage of the connection point P for controlling the first switch transistor 32A and the second switch transistor 32B. Further, the PWM driving controller 31 is connected to the first external power unit 80 through the boost resistor 60, and connected to the first external loading device 90 through the buck resistor 70. Additionally, one end of the capacitor C1 is connected to the first external loading device 90, and the other end of the capacitor C1 is grounded.

The adjustment process of the PWM driving controller 31 is similar to the above embodiment shown in FIG. 2, and not described in the following context. It should be noted that the primary differences between the ninth embodiment in FIG. 14 and the first embodiment in FIG. 2 is that the PWM driving controller 31 in the power converting apparatus of the first embodiment controls only one switch transistor 32, but the PWM driving controller 31 of the ninth embodiment can control the first switch transistor 32A and the second switch transistor 32B at the same time. Thus, when the first switch transistor 32A is NMOS, the PWM driving controller 31 of the present embodiment operates according to the waveforms shown in FIGS. 3, 4 and 5 to control the first switch transistor 32A and the second switch transistor 32B, and when the first switch transistor 32A is PMOS, the PWM driving controller 31 operates according to the waveform shown in FIG. 10, besides the waveforms shown in FIGS. 3, 4 and 5.

Furthermore, to prevent the first switch transistor 32A and the second switch transistor 32B from damage due to overcurrent, it is crucial to keep the first switch transistor 32A and the second switch transistor 32B not turned on at the same time with reference to FIGS. 3, 4 and 5. That is, only when the first switch transistor 32A is turned off, the second switch transistor 32B can be turned on. Accordingly, only when the second switch transistor 32B is turned off, the first switch transistor 32A can be turned on. Alternatively, both the first switch transistor 32A and the second switch transistor 32B are turned off.

Figure 15:
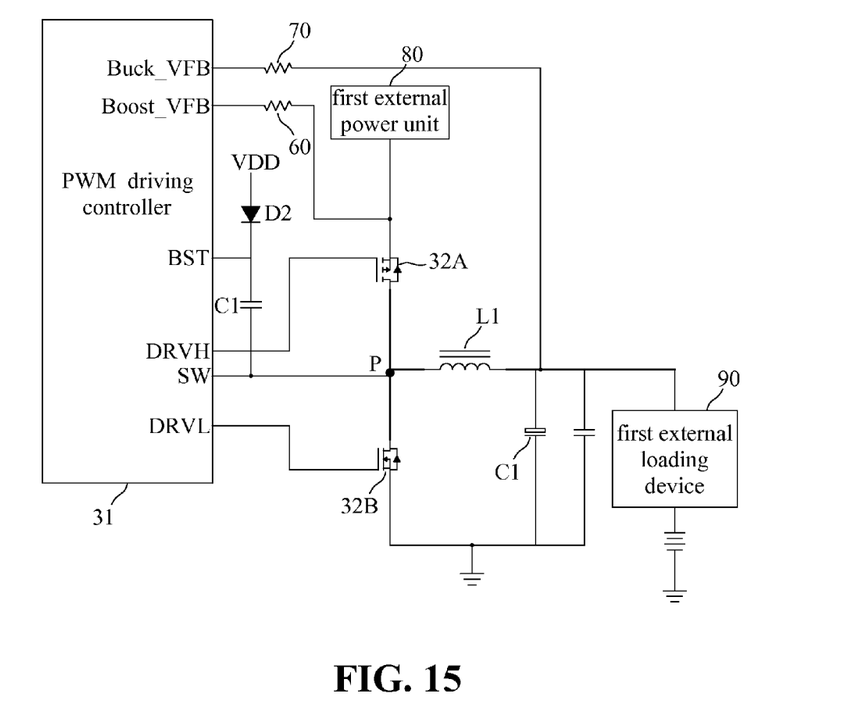
FIG. 15 is a view of the power converting apparatus with dynamical driving adjustment according to the tenth embodiment of the present invention.

FIG. 15 shows the power converting apparatus with dynamical driving adjustment according to the tenth embodiment of the present invention, which is similar to the ninth embodiment shown in FIG. 14. The difference is that the connection for the first external power unit 80 and the first external loading device 90 of the tenth embodiment is opposite in comparison with the ninth embodiment. Therefore, the power conversion apparatus of the tenth embodiment can convert the power with higher voltage from the first external power unit 80 into the power with lower voltage supplied to the first external loading device 90. The buck function of power conversion is achieved and the dynamic adjustment for driving capability is implemented so as to effectively reduce EMI and switching loss.

Accordingly, the PWM driving controllers 31 of the ninth and tenth embodiments are optionally implemented by an electrical circuit formed of discrete electronic elements, or alternatively by a central processing unit or a microcontroller executing a software program or firmware program. Preferably, the PWM driving controllers 31 performs digital operation by use of CPU or MCU, that is, a single integrated circuit (IC).

From the above mentioned, one aspect of the present invention is to employ the adjustment process performed by the PWM driving controller to slow down the turn-on rate of the switch transistor as much as possible when the initial conduction current is zero in DCM, thereby lowering the switching slope of the voltage, increasing EMI margin and reducing EMI. In addition, when the switch transistor operates in DCM and the initial conduction current is not zero, the turn-on rate of the switch transistor is configured as fast as possible to reduce switching loss and increase power conversion efficiency. Also, the electrical property is assured. In particular, the present invention provides the adjustment process for driving capability which is applicable to various circuit structures like forward, full bridge, half bridge, boost structure or buck structure, and thus exhibits much industrial applicability for wide application fields.

Furthermore, the present invention may use different MOS or different transistor as the switch transistor to be driven, and specifically implements the effect of reducing conduction loss and switching loss so as to increase the overall power conversion efficiency.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A power converting apparatus with dynamical driving adjustment for converting an AC (alternative current) input power with an input voltage into an output power with an DC (direct current) output voltage supplied to an external load, comprising:

a rectifying unit for receiving and rectifying the AC input power to generate and transfer a DC power;

a power factor correction unit for receiving the DC power and performing a process of power factor correction to generate and transfer a power factor correction power;

a power conversion unit for receiving the power factor correction power and performing a process of power conversion to generate the output power; and a feedback unit electrically connected to the power conversion unit for generating and transferring a feedback signal based on the DC output voltage of the output power to the power conversion unit, wherein the power conversion unit comprises a transformer, a pulsed width modulation (PWM) driving controller, a switch transistor, an auxiliary diode, an output inductor, an output diode and an output capacitor, the transformer comprises a first side coil and second side coil, a positive end of the output diode is connected to an end of the second side coil, a positive end of the auxiliary diode is connected to an another end of the second side coil, a negative end of the output diode and a negative end of the auxiliary diode are connected to an end of the output inductor, an another end of the output inductor is connected to an end of the output capacitor, an another end of the output capacitor is connected to the another end of the second side coil, the load is connected to the output capacitor in parallel, the switch transistor is connected to an end of the first side coil, the PWM driving controller performs an adjustment process based on the feedback signal to generate a PWM driving signal for controlling the switch transistor to turn on and turn off, the output capacitor generates the output power, the switch transistor is an N type switch element selected from an NMOS transistor or an NPN bipolar transistor, and the adjustment process performed by the PWM driving controller comprises steps of:

during a first rising period, increasing a driving voltage of the PWM driving signal from zero voltage to a first voltage for beginning to turn on the switch transistor such that a drain-source voltage (Vds) of the switch transistor is lowered;

during a second rising period, increasing the driving voltage from the first voltage to a second voltage or more than the second voltage which is larger than the first voltage, for beginning to turn on the switch transistor such that a drain-source voltage (Vds) of the switch transistor is lowered;

sustaining the driving voltage for a preset period;

lowering the driving voltage from the second voltage or more than the second voltage to the first voltage during a first falling period; and lowering the driving voltage from the first voltage to zero voltage during a second falling period, wherein the first voltage is about Miller plateau for the switch transistor, the Miller plateau is referred to a specific constant gate-source voltage (Vgs) lasting for a period of time when the switch transistor shifts from a turn-off state to a turn-on state or from the turn-on state to the turn-off state, the first rising period is prolonged as much as possible to minimize electromagnetic interference, and the second rising period, the first falling period and the second falling period are shortened as much as possible to reduce switching loss and conduction loss.

2. The power converting apparatus as claimed in claim 1, wherein the feedback unit comprises a first resistor, a second resistor, a third resistor, a thyristor and an photo coupler, the first, second and third resistors are sequentially connected in series, a connection point of the first and second resistors is connected to a connection point of the output diode and the output capacitor for receiving the output power, a connection point of the second and third resistors is connected to a gate end (G end) of the thyristor, a positive end (A end) of the thyristor is connected to the output capacitor, the photo coupler is connected between a negative end (K end) of the thyristor and the first resistor such that the photo coupler generates the feedback signal.

3. The power converting apparatus as claimed in claim 1, wherein the first voltage is 3V to 6V, and the second voltage is 7V to 9V.

4. The power converting apparatus as claimed in claim 1, wherein the PWM driving controller is implemented by an electrical circuit formed of discrete electronic elements, or by a central processing unit (CPU) or a microcontroller (MCU) executing a software program or firmware program.

5. The power converting apparatus as claimed in claim 1, wherein a drain-source voltage falling time and a drain-source voltage rising time of the switch transistor at an output electrical power of 36 W are less than 200 ns and 100 ns, respectively, the drain-source voltage falling time means a time when the drain-source voltage of the switch transistor lowers from a highest drain-source voltage to a lowest drain-source voltage during a turn-on process, and the drain-source voltage rising time means a time when the drain-source voltage of the switch transistor increases from the lowest drain-source voltage to the highest drain-source voltage during a turn-off process.

6. The power converting apparatus as claimed in claim 1, wherein the first rising period, the second rising period, the first falling period and the second falling period are prolonged or shortened to dynamically adjust the driving capability of the PWM driving controller.

7. A power converting apparatus with dynamical driving adjustment for converting an AC (alternative current) input power with an input voltage into an output power with an DC (direct current) output voltage supplied to an external load, comprising:

a rectifying unit for receiving and rectifying the AC input power to generate and transfer a DC power;

a power factor correction unit for receiving the DC power and performing a process of power factor correction to generate and transfer a power factor correction power;

a power conversion unit for receiving the power factor correction power and performing a process of power conversion to generate the output power; and a feedback unit electrically connected to the power conversion unit for generating and transferring a feedback signal based on the DC output voltage of the output power to the power conversion unit, wherein the power conversion unit comprises a full bridge structure or a half bridge structure, each of the full bridge structure and the half bridge structure comprises a transformer, a PWM driving controller, al east one switch transistor, an auxiliary diode, an output inductor, an output diode and an output capacitor, the transformer comprises a first side coil and a second side coil, the second side coil is a center tap coil and has a center tap end, an end of the second side coil is connected to a positive end of the output diode, an another end of the second side coil is connected to a positive end of the auxiliary diode, a negative end of the output diode is connected to a negative end of the auxiliary diode and an end of the output inductor, an another end of the output inductor is connected to an end of the output capacitor, an another end of the output capacitor is connected to the center tap end of the second side coil, the output capacitor is connected in parallel to the external load and generates the output power to supply the external load, the PWM driving controller performs an adjustment process based on the feedback signal from the feedback unit so as to generate at least one PWM driving signal for respectively controlling the at least one switch transistor to turn on and turn off, and the adjustment process performed by the PWM driving controller comprises steps of:

during a first rising period, increasing a driving voltage of the PWM driving signal from zero voltage to a first voltage for beginning to turn on the switch transistor such that a drain-source voltage (Vds) of the switch transistor is lowered;

during a second rising period, increasing the driving voltage from the first voltage to a second voltage or more than the second voltage which is larger than the first voltage, for beginning to turn on the switch transistor such that a drain-source voltage (Vds) of the switch transistor is lowered;

sustaining the driving voltage for a preset period;

lowering the driving voltage from the second voltage or more than the second voltage to the first voltage during a first falling period; and lowering the driving voltage from the first voltage to zero voltage during a second falling period, wherein the first voltage is about Miller plateau for the switch transistor, the Miller plateau is referred to a specific constant gate-source voltage (Vgs) lasting for a period of time when the switch transistor shifts from a turn-off state to a turn-on state or from the turn-on state to the turn-off state, the first rising period is prolonged as much as possible to minimize electromagnetic interference, and the second rising period, the first falling period and the second falling period are shortened as much as possible to reduce switching loss and conduction loss.

8. The power converting apparatus as claimed in claim 7, wherein the full bridge structure comprises a first switch transistor, a second switch transistor, a third switch transistor and a fourth switch transistor, and the first, second, third and fourth switch transistors are formed of a NPN bipolar transistor, an NMOS transistor or PMOS transistor.

9. The power converting apparatus as claimed in claim 7, wherein the half bridge structure comprises a first switch transistor and a second switch transistor, and the first and second switch transistors are formed of a NPN bipolar transistor, an NMOS transistor or PMOS transistor.

10. The power converting apparatus as claimed in claim 7, wherein the feedback unit comprises a first resistor, a second resistor, a third resistor, a thyristor and an photo coupler, the first, second and third resistors are sequentially connected in series, a connection point of the first and second resistors is connected to a connection point of the output diode and the output capacitor for receiving the output power, a connection point of the second and third resistors is connected to a gate end (G end) of the thyristor, a positive end (A end) of the thyristor is connected to the output capacitor, the photo coupler is connected between a negative end (K end) of the thyristor and the first resistor such that the photo coupler generates the feedback signal.

11. The power converting apparatus as claimed in claim 7, wherein the first voltage is 3V to 6V, and the second voltage is 7V to 9V.

12. The power converting apparatus as claimed in claim 7, wherein the PWM driving controller is implemented by an electrical circuit formed of discrete electronic elements, or by a central processing unit or a microcontroller executing a software program or firmware program.

13. The power converting apparatus as claimed in claim 7, wherein a drain-source voltage falling time and a drain-source voltage rising time of the switch transistor at an output electrical power of 36 W are less than 200 ns and 100 ns, respectively, the drain-source voltage falling time means a time when the drain-source voltage of the switch transistor lowers from a highest drain-source voltage to a lowest drain-source voltage during a turn-on process, and the drain-source voltage rising time means a time when the drain-source voltage of the switch transistor increases from the lowest drain-source voltage to the highest drain-source voltage during a turn-off process.

14. The power converting apparatus as claimed in claim 7, wherein the first rising period, the second rising period, the first falling period and the second falling period are prolonged or shortened to dynamically adjust the driving capability of the PWM driving controller.

15. A power converting apparatus with dynamical driving adjustment for converting an input power with an input voltage from a first external power unit into an output power with an output voltage higher than the input voltage supplied to a first external loading device so as to implement a boost function, comprising a PWM driving controller, a first switch transistor, a second switch transistor, a boost resistor, a buck resistor, an inductor and a capacitor, wherein the first external loading device is grounded through the first switch transistor and the second switch transistor connected in series, the first switch transistor is formed of an NMOS transistor or a PMOS transistor, the second switch transistor is formed of an NMOS transistor, the PWM driving controller is configured to control a gate of the first switch transistor and a gate of the second switch transistor, the first external power unit is connected to a connection point of the first switch transistor and the second switch transistor through the inductor, the PWM driving controller is connected to the first external power unit through the boost resistor, and connected to the first external loading device through the buck resistor, an end of the capacitor is connected to the first external power unit, an another end of the capacitor is grounded, the PWM driving controller performs an adjustment process by sensing the connection point of the first and second switch transistors so as to generate a PWM driving signal for controlling the first and second switch transistors to turn on and turn off, and the adjustment process performed by the PWM driving controller comprises steps of:

during a first rising period, increasing a driving voltage of the PWM driving signal from zero voltage to a first voltage for beginning to turn on the switch transistor such that a drain-source voltage (Vds) of the switch transistor is lowered;

during a second rising period, increasing the driving voltage from the first voltage to a second voltage or more than the second voltage which is larger than the first voltage, for beginning to turn on the switch transistor such that a drain-source voltage (Vds) of the switch transistor is lowered;

sustaining the driving voltage for a preset period;

lowering the driving voltage from the second voltage or more than the second voltage to the first voltage during a first falling period; and lowering the driving voltage from the first voltage to zero voltage during a second falling period, wherein the first voltage is about Miller plateau for the switch transistor, the Miller plateau is referred to a specific constant gate-source voltage (Vgs) lasting for a period of time when the switch transistor shifts from a turn-off state to a turn-on state or from the turn-on state to the turn-off state, the first rising period is prolonged as much as possible to minimize electromagnetic interference, and the second rising period, the first falling period and the second falling period are shortened as much as possible to reduce switching loss and conduction loss.

16. The power converting apparatus as claimed in claim 15, wherein the first voltage is 3V to 6V, and the second voltage is 7V to 9V.

17. The power converting apparatus as claimed in claim 15, wherein the PWM driving controller is implemented by an electrical circuit formed of discrete electronic elements, or by a central processing unit or a microcontroller executing a software program or firmware program.

18. The power converting apparatus as claimed in claim 15, wherein a drain-source voltage falling time and a drain-source voltage rising time of the switch transistor are less than 200 ns and 100 ns, respectively, the drain-source voltage falling time means a time when the drain-source voltage of the switch transistor lowers from a highest drain-source voltage to a lowest drain-source voltage during a turn-on process, and the drain-source voltage rising time means a time when the drain-source voltage of the switch transistor increases from the lowest drain-source voltage to the highest drain-source voltage during a turn-off process.

19. The power converting apparatus as claimed in claim 15, wherein the first rising period, the second rising period, the first falling period and the second falling period are prolonged or shortened to dynamically adjust the driving capability of the PWM driving controller.

* * * * *